US008645369B2

(12) United States Patent
Poblete et al.

(10) Patent No.: US 8,645,369 B2
(45) Date of Patent: Feb. 4, 2014

(54) CLASSIFYING DOCUMENTS USING IMPLICIT FEEDBACK AND QUERY PATTERNS

(75) Inventors: Barbara Poblete, Barcelona (ES); Ricardo Baeza-Yates, Barcelona (ES)

(73) Assignee: Yahoo! Inc., Sunnyvale, CA (US)

(*) Notice: Subject to any disclaimer, the term of this patent is extended or adjusted under 35 U.S.C. 154(b) by 618 days.

(21) Appl. No.: 12/184,049

(22) Filed: Jul. 31, 2008

(65) Prior Publication Data

US 2010/0030768 A1 Feb. 4, 2010

(51) Int. Cl.
*G06F 17/30* (2006.01)

(52) U.S. Cl.
USPC .......................................................... 707/728

(58) Field of Classification Search
USPC ........................................ 707/723, 727, 728
See application file for complete search history.

(56) References Cited

U.S. PATENT DOCUMENTS

| | | | | |
|---|---|---|---|---|
| 5,706,497 | A * | 1/1998 | Takahashi et al. ..................... | 1/1 |
| 6,185,558 | B1 * | 2/2001 | Bowman et al. ................ | 705/37 |
| 7,050,992 | B1 * | 5/2006 | Bowman et al. ................ | 705/26 |
| 7,769,751 | B1 * | 8/2010 | Wu et al. ........................ | 707/728 |
| 2005/0177555 | A1 * | 8/2005 | Alpert et al. ...................... | 707/3 |
| 2008/0120276 | A1 * | 5/2008 | Chennavasin ..................... | 707/3 |

OTHER PUBLICATIONS

Ricardo Baeza-Yates, "Web Usage Mining in Search Engines", Center for Web Research, Department of Computer Science, Universidad de Chile, Blanco Encalada 2120, Santiago, Chile, 13 pages.

Ricardo Baeza-Yates et al., "Query Clustering for Boosting Web Page Ranking", Center for Web Research, Department of Computer Science, Universidad de Chile, Blanco Encalada 2120, Santiago, Chile, 12 pages.

Ricardo Baeza-Yates et al., "Improving Search Engines by Query Clustering", *Journal of the American Society for Information Science and Technology*, 58(12):1793-1804, 2007.

Ricardo Baeza-Yates et al., "A Website Mining Model Centered on User Queries", Center for Web Research, Department of Computer Science, Universidad de Chile, Blanco Encalada 2120, Santiago, Chile, 17 pages.

Doug Beeferman et al., "Agglomerative Clustering of a Search Engine Query Log", KDD 2000, Boston, MA, pp. 407-416.

Florian Beil et al., "Frequent Term-Based Text Clustering", SIGKDD 02 Edmonton, Alberta, Canada, pp. 436-442, 2002.

Bettina Berendt et al., "Analysis of Navigation Behavior in Web Sites Integrating Multiple Information Systems", *The VLDB Journal* 9:56-75, 2000.

Malu Castellanos, Overview: "HotMiner: Discovering Hot Topics from Dirty Text", pp. 123-157.

Robert Cooley, et al., "Data Preparation for Mining World Wide Web Browsing Patterns", *Knowledge and Information Systems*, 1:1-27 (1999).

Robert Cooley, et al., "WebSIFT:The Web Site Information Filter System", Department of Computer Science, University of Minnesota, Jun. 13, 1999.

(Continued)

*Primary Examiner* — Rehana Perveen
*Assistant Examiner* — Alexander Khong
(74) *Attorney, Agent, or Firm* — Weaver Austin Villeneuve & Sampson LLP

(57) ABSTRACT

Methods and apparatus are described for classifying documents using a document representation model based on implicit user feedback obtained from search engine queries. The model may be used to achieve better results in non-supervised tasks such as clustering and labeling through the incorporation of usage data obtained from the search engine queries.

26 Claims, 6 Drawing Sheets

(56) References Cited

OTHER PUBLICATIONS

Robert Cooley, et al., "Discovery of Interesting Usage Patterns from Web Data", Department of Computer Science and Engineering, University of Minnesota, pp. 1-20.

Georges Dupret, et al., Abstract entitled "Web Search Engine Evaluation Using Clickthrough Data and a User Model", WWW2007, 4 pages, May 8-12, 2007.

Magdalini Eirinaki et al., "Web Personalization Integrating Content Semantics and Navigational Patterns", Athens University of Economics and Business, Department of Informatics, WIDM'04, Washington, DC, 8 pages, 2004.

Johannes Fürnkranz, "Exploiting Structural Information for Text Classification on the WWW", Intelligent Data Analysis, pp. 487-498, 1999.

Hammouda et al., "Phrase-based Document Similarity Based on an Index Graph Model", Department of Systems Design Engineering, University of Waterloo, Proceedings of the 2002 IEEE International Conference on Data Mining, p. 203, 2002.

In-Ho Kang, et al., "Query Type Classification for Web Document Retrieval", SIGIR'03, Proceedings of the 26th Annual International ACM SIGIR Conferenceon Research and development in information retrieval, pp. 64-71, 2003.

George Karypis, Technical Report: "CLUTO—A Clustering Toolkit", Technical Report 02-017, Dept. of Computer Science, University of Minnesota, 66 pages, Apr. 23, 2002.

F. Masseglia, et al., abstract entitled "Using Data Mining Techniques on Web Access Logs to Dynamically Improve Hypertext Structure", Laboratoire PRiSM Universite de Versailles, LIRMM UMR CNRS 5506 161, Sigweb Letters, vol. 8, No. 3, pp. 1-19, 1999.

Bamshad Mobasher, et al., "Automatic Personalization based on Web Usage Mining", *Communications of the ACM*, vol. 43(8):142-151, Aug. 2000.

Mike Perkowitz, et al., Abstract entitled "Adaptive Web Sites: AI Challenge", Department of Computer Science and Engineering, University of Washington, Seattle, WA, 6 pages, 1997.

Barbara Poblete, abstract entitled "A Content and Structure Website Mining Model", in WWW '06: Proceedings of the 15th International Conference on World Wide Web, pp. 957-958, New York, NY, USA 2006. ACM Press.

Barbara Poblete, et al., "Query-Sets: Using Implicit Feedback and Query Patterns to Organize Web Documents", International World Wide Web Conference (IW3C2), Beijing China, pp. 41-50, 2008.

Bruno Possas, "Set-Based Vector Model: An Efficient Approach for Correlation-Based Ranking," ACM Transactions on Information Systems, vol. 23, No. 4, Oct. 2, 2005, pp. 397-429.

Diego Puppin, et al., "Query-Driven Document Partitioning and Collection Selection", in InfoScale '06: Proceedings of the First International Conference on Scalable Information Systems, p. 34, New York, NY, USA May 29-Jun. 1, 2006.

Filip Radlinski, et al., abstract entitled "Query Chains: Learning to Rank from Implicit Feedback", KDD '05: Proceedings of the Eleventh ACM SIGKDD International Conference on Knowledge discovery in data mining, pp. 239-248, New York, NY, 2005.

G. Salton, et al., "A Vector Space Model for Automatic Indexing", *Communications of the ACM*, vol. 18, No. 11, 613-620, Nov. 1975.

Masakazu Seno, et al., "LPMiner: An Algorithm for Finding Frequent Itemsets Using Length-Decreasing Support Constraint", 1st IEEE Conference on Data Mining, 2001, pp. 505-512.

Don Shen, et al., "A Comparison of Implicit and Explicit Links for Web Page Classification", WWW '06: Proceedings of the 15th International Conference on World Wide Web, pp. 643-650, New York, NY, 2006 ACM Press.

Ahu Sieg, abstract entitled "Using Concept Hierarchies to Enhance User Queries in Web-based Information Retrieval", in IASTED International Conference on Artificial Intelligence and Applications, 2004.

Myra Spiliopoulou, "Web Usage: Mining for Web Site Evaluation", *Communications of the ACM*, , vol. 43:8, pp. 127-134, Aug. 2000.

Jaideep Srivastava, et al., "Web Usage Mining: Discovery and Applications of Usage Patterns from Web Data", Department of Computer Science and Engineering, University of Minnesota, SIGKDD Explorations, vol. 1, Issue, 2, Jan. 2000, pp. 12-23.

Paolo Tonella, et al., abstract entitled "Using Keyword Extraction for Web Site Clustering" Proceedings of the Fifth International Workshop on Web Site Evolution, 8 pages, 2003.

Wang et al., abstract entitled "Learn from Web Search Logs to Organize Search Results", SIGIR 2007 Proceedings of the 30th Annual International ACM SIGIR Conference on Research and development in information retrieval, pp. 87-94, New York, NY, 2007.

Yong Wang, et al., "Document Clustering Using Compound Words", Department of Computer Science and Engineering, Mississippi University, The 2005 International Conference on Artificial Intelligence, pp. 307-313.

Gui-Rong Xue, et al., abstract entitled Log Mining to Improve the Performance of Site Search, Proceedings of the Third International Conference on Web Information Systems Engineering, 8 pages, 2002.

Jianhan Zhu, et al., "PageCluster: Mining Conceptual Link Hierarchies from Web Log Files for Adaptive Web Site Navigation", *ACM Transactions on Internet Technology*, vol. 4, No. 2, pp. 185-208, May 2004.

\* cited by examiner

General Log Statistics

| Period | November 2006 |
|---|---|
| Sessions | 610,668 |
| Documents clicked from queries | 29,826 |

| | Website | Top-100 |
|---|---|---|
| Total queries | 158,481 | 126,849 |
| Unique queries | 96,733 | 26,152 |

Table 1: General log statistics for the website.

| | % of Documents | # of Visits |
|---|---|---|
| Not visited | 0.52 | 0 |
| Only from queries | 9.40 | 0.94 |
| Only by navigation | 18.20 | 12.54 |
| Both | 71.87 | 86.51 |

Table 2: General statistics on how users reached the documents of the website.

*FIG. 3*

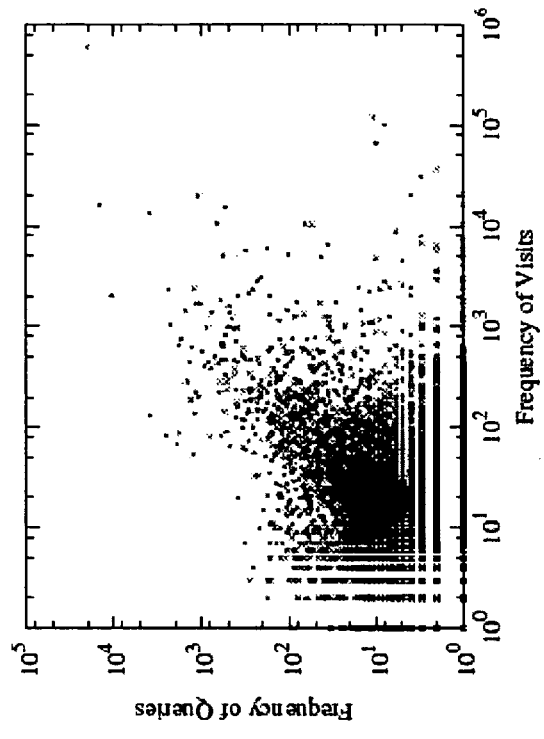
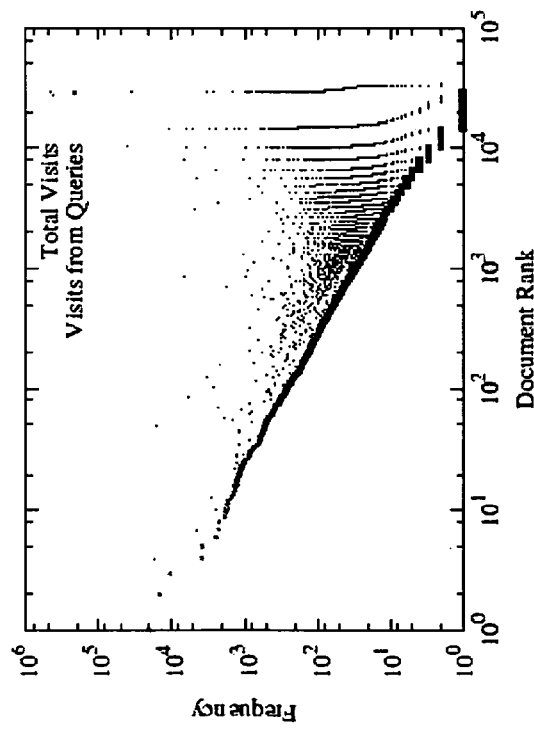
Graph 1: Distribution of query clicks and visits to documents of a website (documents ranked by # of queries then by # of visits).
Graph 2: Scatter plot of the frequency of queries and the frequency of navigational visits in a website (each dot represents a document from the site).
FIG. 4

| DocId | Vector Space | Query | Query-Set |
|---|---|---|---|
| 58 | download, test, file, 2007, guide, publication | official, test, social, publication, module, science, guides | physics, geometry, physics topics, topics, admission topics |
| 74 | able, Europe, world, kingdom, MBA, Asia, library | degree, search, graduate, certificate, advanced, diploma, simulation | university scholarship, universities, university ranking, best universities |
| 47 | scholarship, application, loan, benefit, fill, form | dates, free, vocational, on-line, scholarship, loan | loan, scholarship loan, cosigner loan, application |
| 80 | vitae, curriculum, presentation, job, letter, interview, experience, highlight | CV, letter, resume, recommendation, presentation, example | CV, write CV, curriculum vitae, CV example, write curriculum vitae |

Table 5: Examples of keyword labels obtained with the different document models.

*FIG. 5*

CLASSIFYING DOCUMENTS USING IMPLICIT FEEDBACK AND QUERY PATTERNS

BACKGROUND OF THE INVENTION

The present invention relates to techniques for classifying documents and, in particular, techniques which employ implicit user feedback obtained from search engine queries to classify documents.

As the content on World Wide Web grows, it has become increasingly difficult to manage and classify all of the documents and other content resources. Optimal organization is especially important for web sites, for example, where classification of documents into cohesive and relevant topics is essential to make a site easier to navigate and more intuitive to its visitors. The high level of competition on the Web makes it necessary for web sites to improve their organization in ways that are both automatic and effective so users can find the resources for which they are looking. Web page organization has other important applications. Search engine results can be enhanced by grouping documents into significant topics. These topics can allow users to disambiguate or specify their searches more effectively. Moreover, search engines can personalize results for users by ranking higher the results that match the topics that are relevant to user profiles. Other applications that can benefit from automatic topic discovery and classification are human edited directories, such as DMOZ or Yahoo!. These directories are increasingly hard to maintain as the content of the Web grows. Automatic organization of web documents is also interesting from the point of view of discovering new interesting topics.

The task of automatically clustering, labeling, and classifying documents in a web site is not an easy one. Usually these problems are approached in a similar way for web documents and for plain text documents even though it is known that web documents typically have a richer information set associated with them. According to such conventional approaches, documents are typically represented based on their text, and in some cases some kind of structural information associated with the web documents.

Generally speaking there are two main types of structural information that can be found in web documents. One type is HTML formatting which sometimes allows identification of important parts of a document such as, for example, title and headings. The other type is link information between pages. The information provided by HTML formatting is not always reliable because tags are more often used for styling purposes than for content structuring. And the information given by links, although useful for general web documents, is not of much value when working with documents from a particular website because in such cases we cannot assume that these data are objective. That is, any information extracted from a site's structure about that same site is a reflection of the particular webmaster's criteria which provides no guarantee of being thorough or accurate and, in some cases, might be completely arbitrary. A clear example of this is a web site that has a large amount of content and employs some kind of content management system and/or templates that give virtually the same structure to all pages and links within the site.

SUMMARY OF THE INVENTION

According to the present invention, methods and apparatus are provided for classifying content resources. For each of a plurality of content resources, one or more corresponding queries is/are identified which resulted in selection of the content resource from among search results corresponding to the one or more queries. Itemsets associated with each of the queries are identified. At least some of the itemsets represent patterns in the associated queries. Representations of each of the content resources are generated with reference to the itemsets associated with the corresponding queries. Each of the content resources is classified using the representations.

A further understanding of the nature and advantages of the present invention may be realized by reference to the remaining portions of the specification and the drawings.

BRIEF DESCRIPTION OF THE DRAWINGS

FIG. 3 includes two tables representing statistics for a web site which was used for an evaluation of a particular embodiment of the invention.

FIG. 4 includes two graphs representing query data for documents on the web site of FIG. 3.

FIG. 5 includes a table showing examples of labels obtained using three different document models.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the invention, document representation models are proposed that enable automated classification and organization of documents in ways that take into account how users perceive, experience, and/or use the documents. As used herein, the term "document" refers to any of a wide range of representations of information and/or content resources which may be stored as electronic data and retrieved with a query. Examples of documents which may be used with embodiments of the invention are web pages. Examples of such embodiments are described herein. However, the invention is not so limited.

As an initial approach, a query document model was used that was based on the query view model proposed by M. Castellanos in *Hotminer: Discovering hot topics from dirty text*; Survey of Text Mining; M. W. Berry, editor; Springer-Verlag New York, Inc., Secaucus, N.J., USA, 2003, incorporated herein by reference in its entirety. This approach employed query terms as surrogate text to represent documents, and did not refer to the contents of the documents themselves. However, while the results were measurably (sometimes only marginally) better than conventional approaches, further improvement was desired. Therefore, according to a particular class of embodiments, a "query-set" document model is provided which employs patterns mined from queries as at least part of the basis for the representation of documents.

Figure 1:
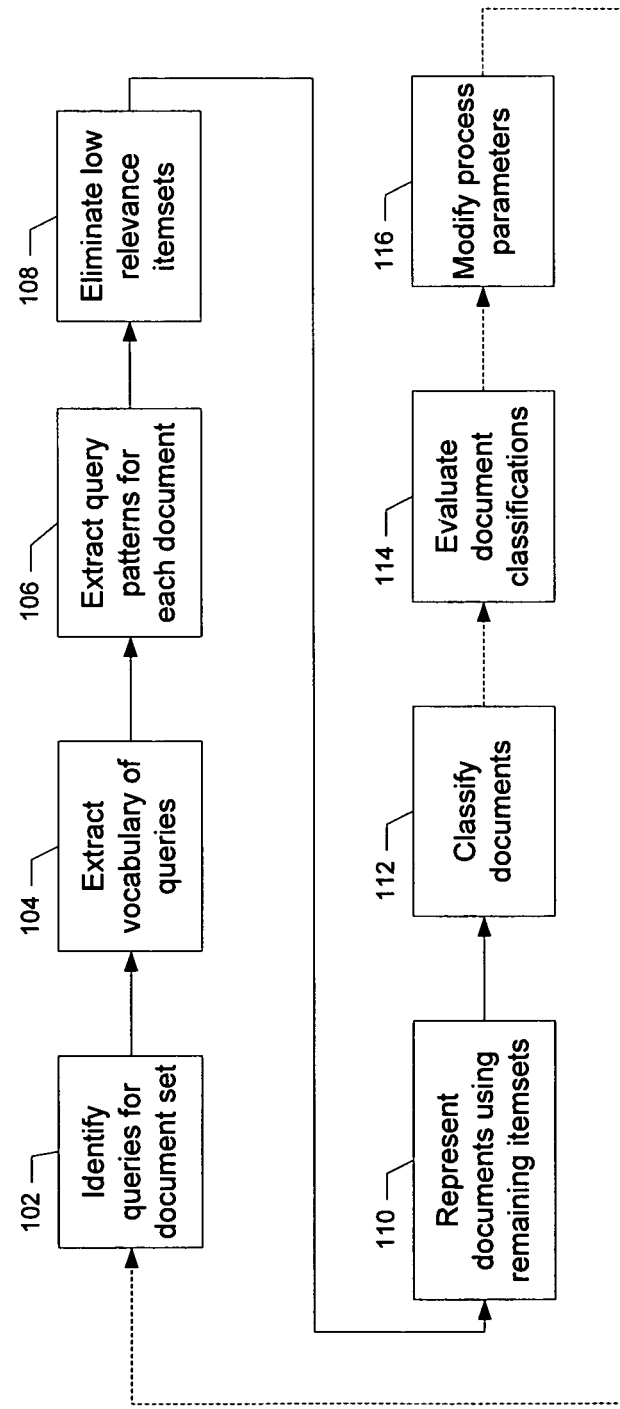
FIG. 1 is a flowchart illustrating operation of a particular embodiment of the present invention.

A particular embodiment of a query-set document model will now be described with reference to the flowchart of FIG. 1. For a given set of documents, all queries in a query log which resulted in selection of documents in the set from among corresponding search results are identified (102). The vocabulary of the queries (i.e., the terms in the queries and their frequencies) are extracted (104). For each document, patterns in the queries corresponding to that document are extracted (106).

According to specific embodiments, the patterns in the queries corresponding to a particular document include the co-occurrence of query terms, i.e., terms which appear together in multiple queries. These co-occurrences may represent combinations of two or more query terms. The occurrence of single query terms may also be employed.

According to some embodiments, once the recurring combinations of query terms are identified, combinations and/or individual terms having low relevance are eliminated (108). This may be done, for example, by only retaining combinations which have relatively high support, i.e., which occur more than some programmable threshold number of times.

The remaining patterns (query term combinations in this example) are then used as at least some of the dimensions of the feature space in which the documents are represented (110). That is, each document is represented by a vector in the feature space which includes scalar values representing both individual query terms and query patterns (e.g., combinations of query terms). The weighting of each of these values is based on the frequency of occurrence of the particular term or the particular pattern. It should be noted that embodiments are contemplated in which vector representations are based exclusively on such query terms and query patterns. However, embodiments are also contemplated in which the content and/or structure of documents may be combined with query terms and query patterns in such vector representations. Embodiments are also contemplated in which at least some documents in a document set are represented solely with reference to content and/or structural information, e.g., in cases where such documents have no corresponding queries.

Figure 2:
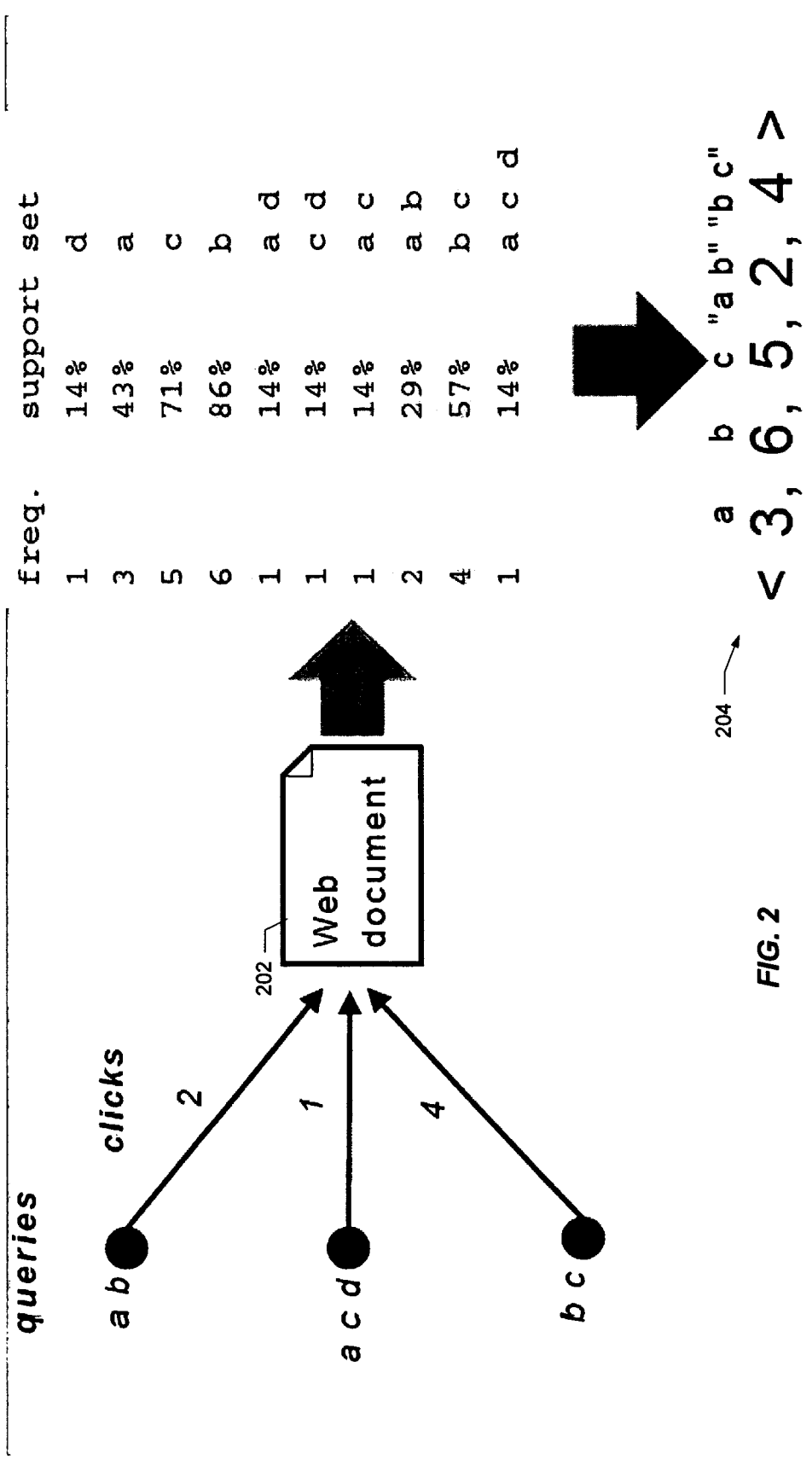
FIG. 2 is a simplified diagram illustrating a vector representation of a document according to a particular embodiment of the invention.

An example of how a vector representation of a particular document may be derived is illustrated in FIG. 2. In this example, 3 different queries have been identified for document 202; a first query ab including the query terms a and b; a second query acd including the terms a, c, and d; and a third query bc including the terms b and c. As shown, document 202 was selected from among the search results two times for query ab, once for the query acd, and four times for the query bc. The support for each query term and each combination of query terms (collectively referred to herein as itemsets) in the example is shown in the table at the right of FIG. 2. For example, the support for query term d is 14% because d appears in only one of the total of seven queries which resulted in selection of document 202. By contrast, the combination bc appears in four of the seven queries, i.e., 57%.

By then eliminating itemsets having an undesirably low level of support (and therefore presumably a correlatively low relevance), a vector 204 representing document 202 may be generated. This might be achieved in this case, for example, by excluding itemsets having a frequency of fewer than 2, a support level below 25%, etc. In general, the threshold employed may vary considerably for different applications, and may be determined experimentally. As shown, the value representing each itemset (shown above the corresponding value) is simply the frequency of that itemset. As will be understood, more sophisticated weighting schemes may be employed.

Any of a wide variety of conventional clustering techniques may then be applied to the documents represented according to the query-set document model to effect document classification and/or organization (112). Once this is done, the document clustering may then be periodically evaluated (114) and iterated with modified parameters (116) for further improvement.

Evaluation of the document clustering may be done, for example, using human feedback, e.g., a user study in which users evaluate the clustering results. According to a particular implementation, the users in the user study were asked to indicate how well each of the documents in a particular cluster matched a label assigned to the cluster using the values "0" (no match) and "1" (match). These data may then be used to manually adjust classifications and/or system parameters for subsequent iterations of the document classification algorithm.

In addition, evaluation and ongoing evolution of the organization of a set of documents may be effected using automated, e.g., machine-learning, techniques in which document classifications are evaluated and modified with reference to subsequent query pattern data on an ongoing or periodic basis. Each iteration of the classification algorithm could be used as a basis for modifying earlier classifications and/or system parameters for subsequent iterations.

As will be discussed with reference to a particular implementation, the performance of a query-set document model was evaluated for a particular document set relative to the performance of a query document model based on the work of Castellanos, and the conventional "bag of words" document model. And as will be shown, query-set document models enabled by the present invention not only classify documents more accurately, they also have the advantage of dramatically reducing the size of the feature space evaluated, e.g., by more than 90% in the example described below. The computational benefits of such a reduction will be appreciated by those of skill in the art.

Embodiments of the invention may be used to effect document classification and/or organization in a wide variety of contexts and for a wide variety of purposes. For example, embodiments of the invention may be particular advantageous in the context of human-edited directories such as, for example, DMOZ, the Yahoo! Directory, the Google Directory, etc. And classification results may be employed, for example, to modify or establish links between documents, as well as to modify or create document hierarchies (e.g., web sites) in ways which are more reflective of the ways in which users actually perceive or use the documents.

Implementation and performance evaluation for a particular embodiment of a query-set model will now be described. Since neither content nor structural data seem to be complete information sources for the task of clustering, labeling, and classification of Web documents, we proposed the incorporation of usage data obtained from the usage logs of the site. In particular, we proposed using the information provided by user queries in search engines. This information may be retrieved, for example, from the referer field of the usage log, and provides insight into the individual user's motivations for selecting certain documents. Terms in queries can be used to describe the topic that users were trying to find when they clicked on a document. These queries provide implicit user feedback that is very valuable. For example, we can learn that if many users reach a document using certain keywords, then it is very likely that the important information in this document can be summarized with reference to those keywords. Following this motivation, we developed a new document representation model which may be employed for clustering, labeling, and classification.

As discussed above, conventional vector model representations for documents are inadequate in that they often do not reflect the most relevant topics of each document from the user's point of view, and which are the best words (or features) for summarizing these topics. Therefore, for modeling Web documents, we believe that it is better to represent documents using queries instead of their actual text content, i.e., using queries as surrogate text. In addition, we extend and modify previous work based on the intuition that queries from which users selected Web documents make better features for the purposes of automatically grouping, labeling, and classifying documents. By associating queries with the selected documents, implicit user feedback is incorporated into the document representation model. By using such feedback, reliance is placed on the relevance judgments of real users rather than those of the search engines (which may be different for different engines). As a results, non relevant pages, in particular spam pages, may be effectively filtered.

According to a particular implementation, there are two main data sources for obtaining queries for particular documents and, depending on the source, these might be partial queries or complete queries. Partial queries result from the case in which the usage data are obtained from a search engine's query log. This situation is most likely to occur when organizing general Web documents or search results. Query clicks to documents discovered from this log are only the ones that were submitted to the particular search engine that generated the log. Therefore, the more widely used the search engine is, the better it will represent the real usage of documents.

Complete queries results from the case in which the usage data are obtained from a website's access logs. This situation is most likely when organizing documents belonging to a particular website. Standard combined access logs allow discovery of queries from Web search engines that directed traffic to the site (i.e., queries which results in selection of documents from the site). Such logs may also contain information about queries to the internal search engine of the website (if one is available).

The main drawback for a query document model based on the work of Castellanos is that such a model considers query terms independent from each other even if they occur many times together in the same query. This can cause the loss of important information since many times more than one term is needed to express a concept. Also a term occurring inside a set can have different meanings if we change other elements in that set. For example, the two-term queries "class schedule" and "class diagram" have different meanings for the word "class." The first refers to academic classes, and the second more likely to UML classes. To address this problem, which happens frequently in Web queries, and according to a particular class of embodiments of the present invention, we propose the query-set document model.

The query-set model uses frequent query patterns as features and aims at preserving the information provided by the co-occurrence of terms inside queries. This is achieved by mining frequent itemsets or frequent query patterns. Every keyword in a query is considered as an item. Patterns or itemsets are discovered through analyzing all of the queries from which a document was selected to discover recurring terms and, in particular, recurring terms that are used together. The support required for particular patterns or itemsets may be decided for each collection experimentally based, for example, on the frequency distribution of queries in a usage log. As described below, the frequent patterns or itemsets mined from queries are more powerful and expressive than features extracted from the full text of the documents.

After the relevant sets of terms for each document are extracted, a weighed vector is created for the query-set document representation. Each dimension of the feature space is given by all the unique relevant term sets found in the usage logs. The weight of each feature in the vector is the number of times that the pattern appears in a query that clicked on the document. More formally we define the query-set document model as follows:

Let $d_1, d_2, \ldots, d_n$ be a collection of documents, and let V represent the vocabulary of all relevant term sets found in the access log L. Moreover, let $ts_1, ts_2, \ldots, ts_m$ be the list of term sets in vocabulary V. Let $Q(d_i)$ be set of queries found in L from which users clicked at least one time on a document $d_i$, and let the frequency of $ts_j$ in $Q(d_i)$ be the total number of times that queries that contained $ts_j$ reached $d_i$. The query-set vector representation of $d_i$ is defined as:

$$\vec{d}_i = \langle C_{i1}, C_{i2}, \ldots, C_{im} \rangle$$

where $$C_{ij} = t_f\text{-}idf(ts_j, Q(d_i))$$

And tf-idf $(ts_j, Q(d_i))$ is the tf-idf weight assigned to $ts_j$ for $Q(d_i)$.

Since the query-based approaches described herein represent documents only by using queries, it may be necessary to consider documents that do not register visits from queries to model a complete collection of documents. There are several alternatives for modeling and clustering these remaining documents. One approach is to model documents with queries using the query-set model, and for the remaining documents use a partial set-based model as proposed by B. Possas, N. Ziviani, J. Wagner Meira, and B. Ribeiro-Neto in *Set-based vector model: An efficient approach for correlation-based ranking*; ACM Trans. Inf. Syst., 23(4): 397-429, 2005, incorporated herein by reference in its entirety, but only using the feature space of the query-sets (V).

An evaluation of this query-set document model relative to other models will now be described. In this example, we chose to use a website with its access logs as a basis for the data. This decision was based on the fact that by using a website's logs we have access to complete queries which, in turn, provide a full view of the query range from which users visited the site. The second motivation for evaluating using a website is that the documents in the set already have a strong similarity so the clusters are likely to be specialized and nontrivial.

For the evaluation we used as a case study a large portal directed to university students and future university applicants. The website gathers a great number of visits and content from a broad spectrum of educational institutions. Table 1 in FIG. 3 shows some general statistics of the one month log used for this evaluation. Table 2 in FIG. 3 illustrates how the different documents in the website were found by users. Documents in Table 2 are divided into (1) URLs that were not visited by users, (2) URLs that only had visits as a result of a query click, (3) URLs that only had visits as a result of user navigation (e.g., browsing), and (4) URLs that had visits from both query clicks and browsing. From this information, we can observe that the documents clicked at some point from queries represent more than 81% of the documents on the site and more than 87% of the traffic to the site. Therefore, we can be confident that this evaluation applies to a large fraction of the pages, as well as the most important pages in the site.

In Graph 1 of FIG. 4 we show the documents in the site sorted by query click frequency and by visit frequency. We can observe that the query click frequency distribution over documents is a power law with exponent −0.94. This is a very low absolute value in comparison with the usual power law found in Web search engine data. We believe this can be explained by the fact that the power law distribution of words in queries is correlated with the power law distribution of words in documents. Therefore, since query-based models only study queries with clicked results, the query document distribution decays at a slower pace than the usual word-document distribution. On the other hand, in Graph 2 of FIG. 4, we can see the correlation between the frequency of queries and the frequency of navigational visits (without considering clicks from queries) for the URLs is low. This implies something that we expected, i.e., that queries are being used to find documents that are not found usually by navigation. As a result, the organization of documents into topics using queries can provide additional information to the current structure of the site.

To evaluate the performance of the query-set document model proposed herein, we compared its performance to both a conventional "bag of words" document model (also referred to herein as the vector-space model) and a query document model based on the query view model proposed by Castellanos (i.e., the query model). The sample of documents was the 100 documents having the most queries on the site, thus capturing a large fraction of the queries to the site (see Table 1 of FIG. 3).

Each one of the 100 documents in the sample was modeled according to the three different document models resulting in a total of 300 different representations. All the data (log and Web pages) were previously cleaned using standard approaches which include the removal of stopwords and irrelevant requests, among other things. For the vector-space representation, only text content from each document was considered, and no hypertext characteristics were used. The queries used were queries submitted by users during a one month period. The log data used and the content of the documents belong to the same time period. Each of the 3 sets of document representations was clustered into 15 clusters, and automatically labeled using the top most descriptive features of each group using the clustering system CLUTO as described by G. Karypis in *CLUTO a clustering toolkit*, Technical Report 02-017, Dept. of Computer Science, University of Minnesota, 2002 (see www.cs.umn.edu/~cluto).

The number of clusters was chosen experimentally by trying a few numbers that seemed appropriate for the number of documents and desired level of granularity of topics. We tested the use of 10, 15, 20, and 25 clusters for the vector-space representation, and decided based on the one that provided the greatest increase of internal similarity (ISim) and at the same time less external similarity (ESim). ISim is the average similarity between the objects of each cluster (i.e., internal similarities), and ESim is the average similarity of the objects of each cluster and the rest of the objects (i.e., external similarities). In general, the choice of the appropriate number of clusters is a complex task, and may vary considerably depending on the document set. In this evaluation, our choice was based on the ISim and ESim values determined using the vector-space representations, as well as what seemed appropriate by inspecting the documents themselves.

The clustering process used was sequential bisections, optimizing in each iteration the global clustering function:

$$\max\left(\sum_{i=1}^{k} \sqrt{\sum_{v,u \in S_i} sim(u, v)}\right)$$

where k is the total number of clusters, Si is the number of elements in the i-cluster, u and v represent two objects in the cluster, and sim (u, v) corresponds to the similarity between two objects u and v. The similarity in this case was measured using the cosine function between vectors.

Each clustering process automatically assigned a cluster and a label to each document. To evaluate the appropriateness of the automatically assigned clusters and labels, each document representation was classified by three (out of a group of six) human experts on the subject area of the site. Each judge measured the quality of a document to its label for a number of documents (between a 100 or 200) from the total of the 300 document representations. The experts were asked to evaluate using 1 or 0, i.e., whether or not the document belonged to the topic described by its label.

For the query-set document model the minimum support required for query patterns of different sizes was determined experimentally. We analyzed all query patterns contained in the log sample and then plotted the histogram of the number of queries that had different support levels using LPMINER (see *Lpminer: An algorithm for finding frequent itemsets using length-decreasing support constraint* by M. Seno and G. Karypis; Proceedings of the 2001 IEEE International Conference on Data Mining, pages 505-512, IEEE Computer Society, 2001, incorporated herein by reference in its entirety). This was done for patterns with 1, 2, 3, 4, and 5 terms to obtain the support level for each case which was chosen by ruling out support levels that include too many query patterns. Table 3 below shows a summary of the resulting support.

TABLE 3

| Terms | Support |
|---|---|
| 1 | 10.00% |
| 2 | 9.80% |
| 3 | 9.00% |
| 4 | 2.15% |
| 5 | 0.95% |

In Table 4 we show the overall results obtained for each type of document representation. This includes the quality, the number of total features (or dimensions), and the level of inter-judge agreement during the classification process. The quality of a document within each representation, was decided using the vote of the majority (at least two judges out of three). From this table, it is important to notice that both models based on queries outperform the vector-space representation, but the query-set model makes exceptional improvements in all of its results. Table 5 in FIG. 5 shows some examples of labels obtained with the different document models. It is important to note that the topics for the query-based methods are both similar, but these labels differ greatly from the vector space labels (i.e., they prioritize very different terms).

TABLE 4

| Model | Quality | Dimensions | Agreement |
| --- | --- | --- | --- |
| Vector-Space | 40% | 8,910 | 69% |
| Query | 57% | 7,718 | 67% |
| Query-Set | 77% | 564 | 81% |

In Table 4 we can view the level of inter-judge agreement for each model's clustering. As shown, the agreement is relatively high for all models, although agreement for the query-set model reaches 81%. Given that the possibility of inter-judge agreement happening by random chance is extremely low, we believe that the query-set model has higher agreement because the features and document labels are more accurate to what users expect than in other models.

The evaluation described above shows that queries, and in particular patterns in queries, are excellent features for describing documents. As described above, the query-based representations outperformed the vector-space model when clustering and labeling documents of a website. Relative to the vector-space model, the query-set model in particular reduced by over 90% the number of features needed to represent a set of documents, and improved by more than 90% the quality of the classification. These improvements represent important advantages, particularly for very large document collections, in that the computational cost is greatly reduced while simultaneously greatly increasing the quality of the results.

Embodiments of the present invention may be employed to classify documents and other content resources in any of a wide variety of computing contexts. For example, as illustrated in the network diagram of FIG. 6, implementations are contemplated in which a population of users interacts with a diverse network environment, searching for and selecting documents, via any type of computer (e.g., desktop, laptop, tablet, etc.) 602, media computing platforms 603 (e.g., cable and satellite set top boxes and digital video recorders), mobile computing devices (e.g., PDAs) 604, cell phones 606, or any other type of computing or communication platform. As discussed above, the population of users might include, for example, users of documents associated with human-edited directories such as, for example, DMOZ, the Yahoo! Directory, the Google Directory, etc. However, it should be understood that these are only examples of sets of content resources which may be classified according to the invention. Any set of content resources for which search query data are available (represented by computing device and associated data store 601) may be classified in a manner enabled by the invention.

Figure 6:
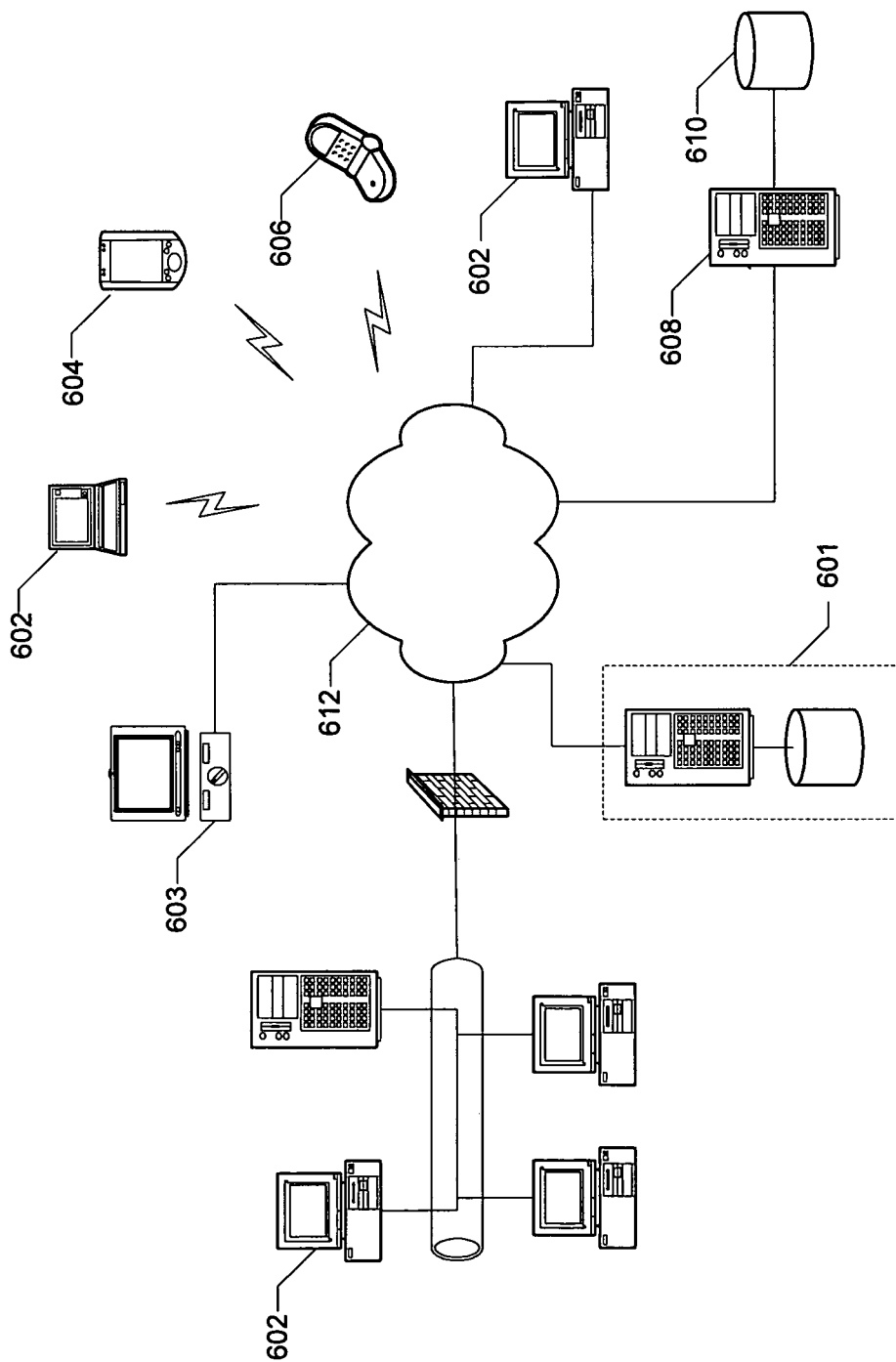
FIG. 6 is a simplified diagram of a computing environment in which embodiments of the present invention may be implemented.

Regardless of how the content resources are organized or distributed, they may classified using search query data in some centralized manner. This is represented in FIG. 6 by server 608 and data store 610 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 612.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method, comprising:
for each one of a plurality of documents, identifying a plurality of queries which resulted in user selection of the one of the plurality of documents from among search results provided in response to the queries;
identifying itemsets within the queries, at least some of the itemsets representing recurring patterns in the queries;
for each one of the plurality of documents, generating a representation of the corresponding one of the plurality of documents, wherein the representation of the one of the plurality of documents is generated based, at least in part, upon the itemsets identified within the corresponding queries which resulted in user selection of the document from among the search results provided in response to the corresponding queries; and
for each one of the plurality of documents, classifying the one of the plurality of documents using the corresponding representation;
wherein, for each one of the plurality of documents, the representation of the one of the plurality of documents comprises a vector including a plurality of scalar values, each scalar value representing a frequency with which a represented one of the itemsets appears within the corresponding queries.

2. The method of claim 1 wherein generating the representations comprises excluding first ones of the itemsets from the representations for corresponding ones of the documents, each of the first itemsets having an associated frequency for the corresponding documents which is below a threshold.

3. The method of claim 1 wherein the patterns in the associated queries comprise combinations of keywords.

4. The method of claim 1 wherein the representation of each of the plurality of documents does not include data derived from the corresponding one of the plurality of documents.

5. The method of claim 1 further comprising evaluating the classifying of each of the plurality of documents, and repeating the classification of the documents based on results of the evaluation.

6. The method of claim 1 wherein the documents comprise web pages.

7. The method of claim 6 further comprising organizing a web site comprising the web pages based on the classifying of each of the plurality of documents.

8. A computer program product for classifying content resources, the computer program product comprising at least one non-transitory computer-readable medium having computer program instructions stored therein which are configured, when executed by at least one computing device, to:
for each one of a plurality of documents, identify a plurality of corresponding queries which resulted in user selection of the one of the plurality of documents from among search results provided in response to the queries;

identifying itemsets within the queries, at least some of the itemsets representing recurring patterns in the queries;

for each one of the plurality of documents, generate a representation of the corresponding one of the plurality of documents, wherein the representation of the one of the plurality of documents is generated based, at least in part, upon the itemsets identified within the corresponding queries which resulted in user selection of the document from among the search results provided in response to the corresponding queries; and for each one of the plurality of documents, classify the one of the plurality of documents using the corresponding representation;

wherein, for each one of the plurality of documents, the representation of the one of the plurality of documents comprises a vector including a plurality of scalar values, each scalar value representing a frequency with which a represented one of the itemsets appears within the corresponding queries.

9. The computer program product of claim 8 wherein the computer program instructions are configured to generate the representation of each of the plurality of documents by excluding first ones of the itemsets from the representation for a corresponding one of the plurality of documents, where each of the first itemsets has an associated frequency for the corresponding one of the plurality of documents which is below a particular threshold.

10. The computer program product of claim 8 wherein the patterns in the associated queries comprise combinations of keywords.

11. The computer program product of claim 8 wherein the representation of each of the plurality of documents does not include data derived from the corresponding one of the plurality of documents.

12. The computer program product of claim 8 wherein the computer program instructions are further configured to evaluate the classifying of the plurality of documents, and repeat the classification of the plurality of documents based on results of the evaluation.

13. The computer program product of claim 8 wherein the documents comprise web pages.

14. The computer program product of claim 13 wherein the computer program instructions are further configured to organize a web site comprising the web pages based on the classifying of the each of the plurality of documents.

15. A system comprising at least one computing device configured to:

for each one of a plurality of documents, identify a plurality of corresponding queries which resulted in user selection of the one of the plurality of documents from among search results provided in response to the queries;

identifying itemsets within the queries, at least some of the itemsets representing recurring patterns in the queries;

for each one of the plurality of documents, generate a representation of the corresponding one of the plurality of documents, wherein the representation of the one of the plurality of documents is generated based, at least in part, upon the itemsets identified within the corresponding queries which resulted in user selection of the document from among the search results provided in response to the corresponding queries; and for each one of the plurality of documents, classify the one of the plurality of documents using the corresponding representation;

wherein, for each one of the plurality of documents, the representation of the one of the plurality of documents comprises a vector including a plurality of scalar values, each scalar value representing a frequency with which a represented one of the itemsets appears within the corresponding queries.

16. The method of claim 1, wherein the representation of each of the plurality of documents is not generated with reference to terms within the corresponding one of the plurality of documents.

17. The method of claim 1, wherein classifying each of the plurality of documents using the corresponding representation is performed without reference to terms within the corresponding one of the plurality of documents.

18. The method of claim 1, further comprising:
modifying the representations of at least some of the documents with reference to subsequent query pattern data.

19. The method of claim 1, wherein each of the plurality of documents is represented only by using queries.

20. The method of claim 1, wherein the each of the plurality of documents is represented using the corresponding queries instead of actual text content of the corresponding one of the plurality of documents.

21. The method of claim 1, wherein the corresponding queries act as surrogate text of the corresponding one of the plurality of documents.

22. The method of claim 1, wherein the one or more corresponding queries which resulted in user selection of the document from among the search results provided in response to the queries are identified from a query log.

23. The method of claim 22, wherein the user selection of the document comprises a query click to the document, wherein the query click to the document is identified from the query log.

24. The method of claim 1, wherein the plurality of queries which resulted in user selection of the one of the plurality of documents from among search results provided in response to the queries comprise all queries which resulted in user selection of the one of the plurality of documents from among search results provided in response to the queries.

25. The method of claim 1, wherein the patterns comprise one or more co-occurrences, each of the co-occurrences representing a combination of two or more keywords.

26. The method of claim 1, wherein classifying the one of the plurality of documents using the corresponding representation comprises:
classifying the one of the plurality of documents into one of a plurality of clusters, each of the plurality of clusters corresponding to a different one of a plurality of topics.

* * * * *